United States Patent [19]

Fosse et al.

[11] 3,714,419

[45] Jan. 30, 1973

[54] SYSTEM FOR THE TRANSMISSION OF INFORMATION TO A VEHICLE ON RAILS

[75] Inventors: Jacques Andre Charles Fosse, 92 Chatillon-sous-Bagneux; Joel Albert Pelletier, Issy-les-Moulineaux 92, both of France

[73] Assignee: U.S. Philips Corporation, New York, N.Y.

[22] Filed: July 1, 1970

[21] Appl. No.: 51,574

[30] Foreign Application Priority Data

July 1, 1969 France ................................6922194

[52] U.S. Cl. ..............246/63 C, 246/187 B, 340/310

[51] Int. Cl. ..............................................B61l 23/16

[58] Field of Search .340/310, 216; 246/34 R, 187 B, 246/63 C; 179/15 BM

[56] References Cited

UNITED STATES PATENTS

| | | | |
|---|---|---|---|
| 3,451,052 | 6/1969 | Anderson et al. | 340/310 |
| 3,482,243 | 12/1969 | Buchsbaum | 340/310 X |
| 2,415,920 | 2/1947 | Thomas | 179/15 BM |
| 3,532,877 | 10/1970 | Thorne-Booth | 246/63 C |

*Primary Examiner*—Gerald M. Forlenza
*Assistant Examiner*—George H. Libman
*Attorney*—Frank R. Trifari

[57] ABSTRACT

A system for transmitting additional information throughout a railroad communication system that uses unmodulated signals representing signalling information transmitted through the rails by superimposing pulses having pulse repetition periods representing additional information on the unmodulated signals. A vehicle is provided with means for picking up the signals from the rails, decoding the pulse signals and displaying the additional information.

6 Claims, 6 Drawing Figures

*INVENTORS*

JACQUES A. C. FOSSE &

*BY* JOEL A. PELLETIER

AGENT

INVENTORS

JACQUES A. C. FOSSE &
JOEL A. PELLETIER

BY

[signature]

AGENT

INVENTORS
JACQUES A.C. FOSSE &
JOEL A. PELLETIER
BY
AGENT

SYSTEM FOR THE TRANSMISSION OF INFORMATION TO A VEHICLE ON RAILS

The invention relates to a system for the transmission of information to a vehicle on rails, in which the rails are utilized as information carriers.

It is known that a railway is divided into sections of given lengths, which are isolated from each other with respect to signalling, there being provided means for establishing an uninterrupted direct connection along the line so that in the case of an electrified railway the traction current can flow back.

A railway section comprises a transmitter which is connected at one end to said means establishing the direct connection, in this case a transformer, the secondary winding of which has a central taps which is connected to the central taps of the secondary winding of the transformer of the adjacent section, there being connected to the transformer a receiver at the other, which controls a line relay, which controls the signals arranged along the track. The axles of the wagons travelling through the section produce a short-circuit between the two rails and transmit in this way the information to the signal stations that the section is occupied.

The frequencies of said transmitters differ from section to section so that in the event of an unwanted short-circuit between adjacent sections of a receiver by the transmitter of the adjacent section is avoided. A third frequency may sometimes be required. In order to cover all possible modes of operation (traction by direct current and alternating current of 50 Hz), the three frequencies are chosen to be different from 50 Hz and from harmonics thereof; they are, for example, equal to 75, 85, 110 Hz.

It is important and in some cases even necessary (e.g. trains passing with high speed along tracks whose section lengths are not designed for high-speed traffic) to transmit information from the line to the locomotive, particularly information relating to the speeds to be observed in each section.

The present invention has for its object inter alia to provide a method and a device which permit of carrying out such a transmission.

According to the invention the system for the transmission of information to a vehicle on rails, in which the busy or free information of a section is supplied to the line circuit in the form of a non-modulated signal of suitable frequency, is characterized in that said non-modulated signal carries additional information formed by short pulses of high amplitude, which are produced synchronously with the frequency of said signal, on which they are superimposed with a pulse repetition time of N periods of said frequency, wherein N is characteristic of the relevant information.

The device for carrying out the method according to the invention comprising a transmitter for transmitting said non-modulated signal at the line circuit end farthest away viewed in the direction of travel of the vehicle, said transmitter being connected to the connecting terminal of the line circuit, and a line receiver coupled with the other end of the line circuit at the other connecting terminal, said receiver controlling a line relay, is characterized in that a coder adapted to co-operate synchronously with said transmitter is provided, which provides short pulses of high amplitude, which are superimposed on the transmitter signal, the vehicle accomodating means for picking up said information superimposed on the non-modulated signal, said line receiver comprising a decoder which detects the code from the coder and controls the coder of the next section.

It should be noted that the device according to the invention may be employed in non-electrified line and in an electrified line with direct current of 1,500 V or alternating current of 25 kV.

The invention will be described more fully with reference to the accompanying drawing.

Figure 1:
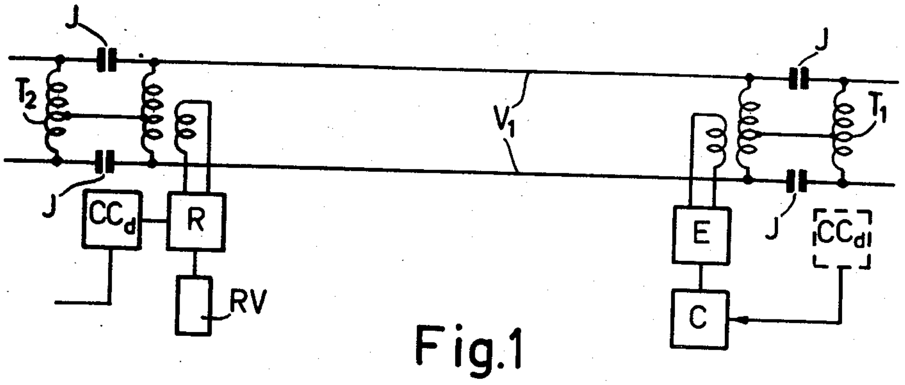
FIG. 1 shows schematically the device according to the invention.

FIG. 1 shows schematically a track circuit in which a railway section V is bounded by four isolated rail connections J. The direct connection is obtained by line transformers $T_1$ and $T_2$, whose windings connected between the rails comprise interconnected central taps. The transformer $T_1$ has coupled with it a winding which is connected to a transmitter E, producing a sinusoidal oscillation of a frequency of 75, 85 or 110 Hz. To the transmitter E is joined a coder C, which provides the short pulses of high amplitude. To the transformer $T_2$ is connected a winding, which is connected to a receiver R controlling a line relay RV. To the receiver is furthermore added a decoder CCd, which passes information to the next section.

Figure 4:
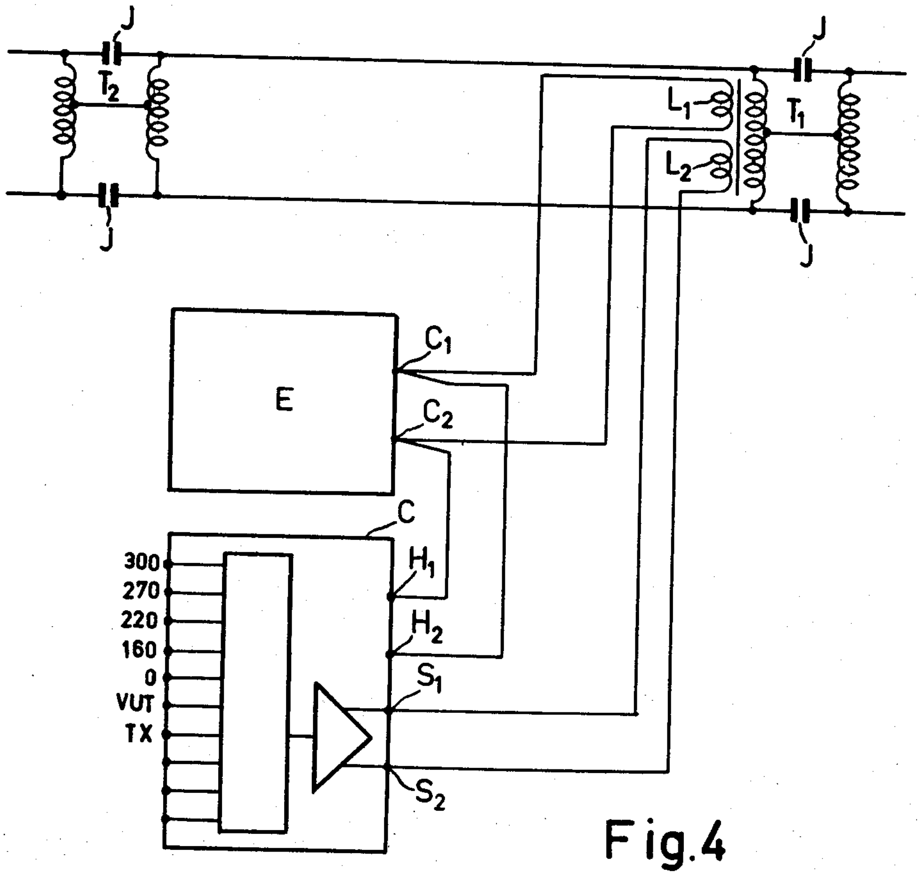
FIG. 4 shows schematically the transmitter part of the system.

FIG. 4 shows in detail the transmitter part of the system. The terminals $C_1$ and $C_2$ of the transmitter E (mainly comprising a sine oscillator followed by an amplifier) are connected on the one hand to a winding $L_1$ of the transformer $T_1$ and on the other hand to two terminals $H_1$ and $H_2$ of the code pulse generator C. The purely sinusoidal signal produced by the transmitter E is utilized in said generator as a clock signal. The generator C comprises a coder producing short pulses whose repetition frequency determines the nature of the information. At the output of the coder is provided an amplifier A, which imparts a sufficient amplitude to said pulses. The output $S_1$–$S_2$ of said amplifier is connected to a winding $L_2$ of the transformer $T_1$.

Figure 2:
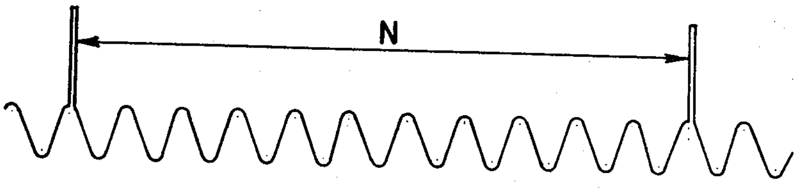
FIG. 2 illustrates the waveform of the signals from the transmitter in accordance with the invention.

The course of the complex signal applied to the line circuit is illustrated in FIG. 2. The purely sinusoidal signal from E has superimposed on it the short pulses of high amplitude, which appear, for example, at the peaks of the sinusoidal signal.

Figure 5:
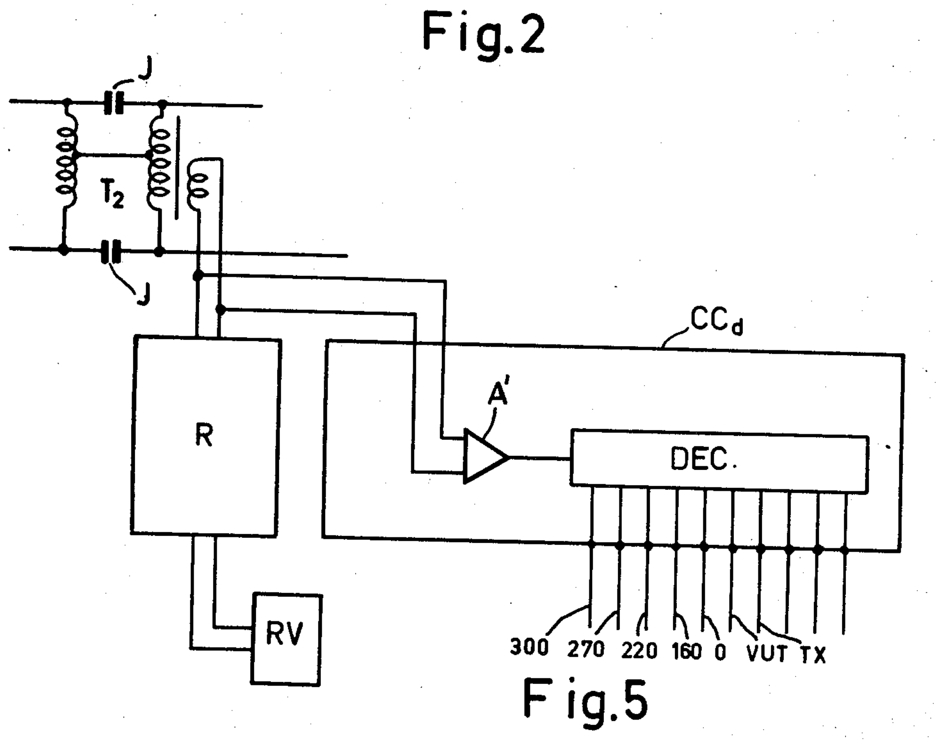
FIG. 5 shows schematically the receiver part thereof.

FIG. 5 shows the receiver part of the system. A winding $L_3$ of the line transformer $T_2$ is connected to the receiver R, which controls a line relay RV actuating a signal station and which is connected to a decoder CCd. Subsequent to amplification in A′ the incoming signal is applied to a decoder DEC, by which information is transmitted to the transmitter of the next section.

Figure 6:
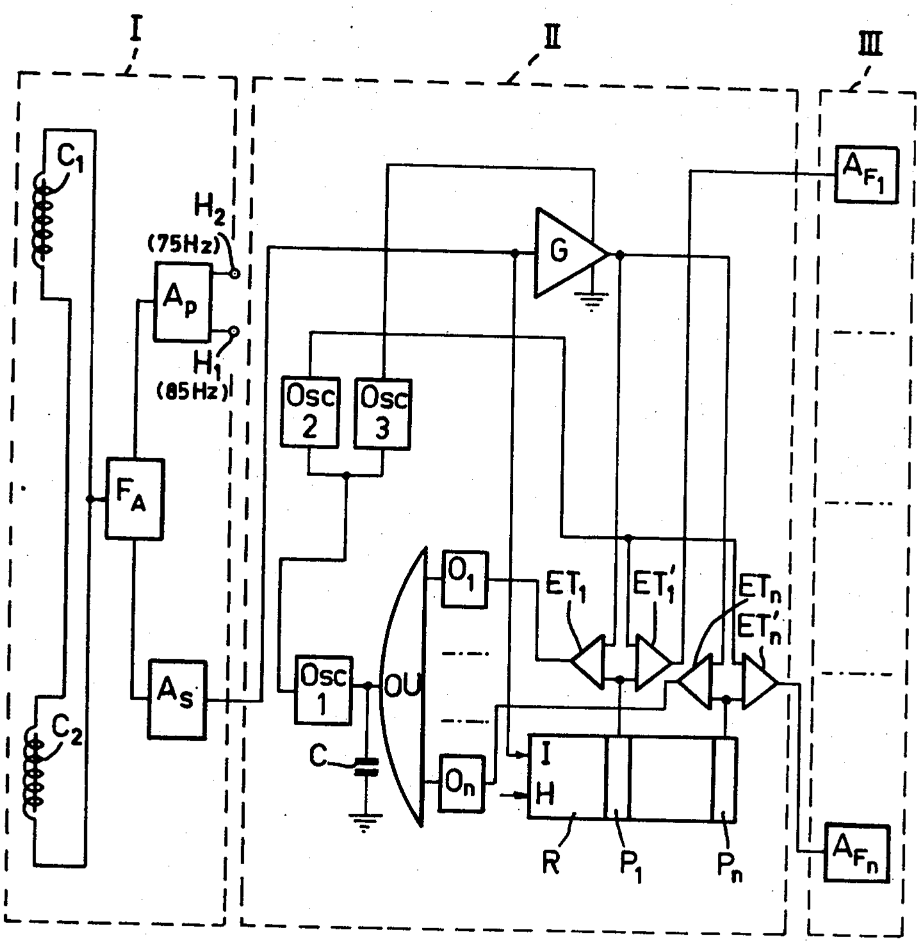
FIG. 6 illustrates the mode of reception of the information on board the locomotive.

The receiver of the locomotive shown schematically in FIG. 6 comprises three main parts:

The first part framed out by broken lines I comprises the pick-ups $C_1$,$C_2$ arranged in front of the first axle and adapted to pick up the signals passing through the rails, the train always travelling towards the transmitter. After the pick-ups a directional filter $F_A$ is arranged, which is capable of separating the sinusoidal signal of 75 or 85 Hz from the pulses. The channel of the sinusoidal signal comprises an amplifier $A_p$ and means are provided for regenerating this signal, if required. The pulse channel comprises a pulse amplifier $A_s$ having an adjustable threshold.

The second part, framed out by a broken line II, is employed for discriminating the repetition frequency of the pulses and hence for identifying the information. It comprises a shift register R, two and-gate circuits $ET_1$, $ET'_1$; . . . $ET_n$, $ET'_n$ for each kind of information, an amplifier G, an oscillator $O_1$ . . . $O_n$ for each kind of information, these $n$ oscillators being all operative on the same frequency, but having output windings of differing numbers of turns, an or-gate circuit OU having a number of inputs equal to the number of kinds of information and a group of three oscillators Osc.1, Osc.2 and Osc.3.

A first information pulse passed by the amplifier $A_s$ is applied to the input I of the register R. This first pulse passes through the register under the control of the sinusoidal clock signal applied to the input H of the register and derived from the amplifier $A_p$. When the first pulse reaches the position $P_1$ of the register (which position corresponds to the first kind of information), a pulse appears at the input I of the and-gate $ET_1$. A second pulse from the amplifier $A_s$ is applied, in addition, via the amplifier G to the input H of said and-gate $ET_1$. Pulse coincidence thus occurs at the two inputs of the gate $ET_1$, the output signal of which excites the oscillator $O_1$. The output signal of the oscillator $O_1$ charges via the or-gate OU the capacitor C of the oscillator Osc.1 to a voltage which is proportional to the delay time in the register R from the input to the position $P_1$. The oscillator Osc.1 operates as a delay element. The oscillator Osc.1 oscillates as long as the capacitor C is not discharged and thus cuts off the oscillators Osc.2 and Osc.3. The cut-off of the oscillators Osc.2 and Osc.3 results in that the amplifier G is not fed for a given time between the information pulses (so that a protection from stray signals is obtained), whereas on the other hand no signal is applied to the input II of the second and-gate $ET'_1$.

Just prior to the appearance of the third pulse of $A_s$ the discharge of the capacitor C of the oscillator Osc.1 terminates, so that the oscillators Osc.2 and Osc.3 can again become operative. The amplifier G is then fed and a pulse will appear at the input H of the gate $ET'_1$. When in addition the second pulse arrives at the position $P_1$, pulse coincidence occurs at the two inputs of the circuit $ET'_1$, which thus applies a signal to a display device $A_F$ of the third part, which is framed out in FIG. 6 by the broken line III.

The kinds of information of differing repetition frequencies are all treated in the aforesaid manner.

The method described above provides a high degree of safety and prevents stray pulses from actuating the system, since the decoders are only sensitive at the instants of appearance of the useful pulses.

If it is desired, for example, to pass information to the locomotive relating to speed limits to be observed, to works in course of execution (TX) or to a temporary one-track traffic (VUT), the code may be as follows:

| N | Code |
|---|---|
| 11 | 300 kms/h. |
| 13 | 270 kms/h. |
| 15 | 220 kms/h. |
| 17 | 160 kms/h |
| 19 | 0 (active) |
| 21 | VUT |
| 23 | TX |

Figure 3:
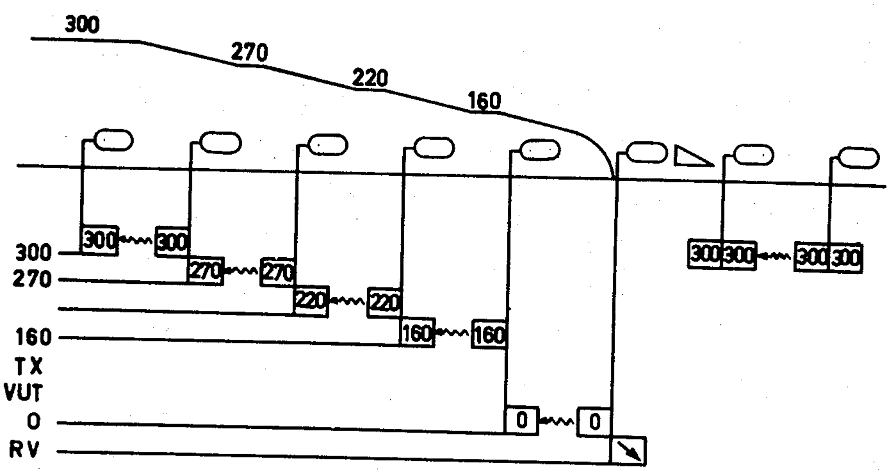
FIG. 3 illustrates the operation of the signalling method in the system according to the invention.

FIG. 3 shows the principle of the signalling process as it is carried out by the device in accordance with the invention.

We claim:

1. A system for the transmission of information throughout a railroad system having a plurality of adjacent rail sections for the transmission of unmodulated signals, said signals having frequencies representing signalling information, each section being electrically isolated for operation at a different frequency, said information systems comprising transmitting means coupled to said sections for producing pulses synchronously with the frequency of said signals, said pulses being superimposed upon said signals and having variable pulse repetition periods representing additional information and receiving means within railroad vehicles for picking up and decoding said additional information.

2. A system as claimed in claim 1 wherein said transmitting means is coupled to remote terminals of said sections viewed in the direction of travel of said railroad vehicle and comprises an oscillator for producing an unmodulated signal at a frequency representing said section, and a pulse code modulator coupled to said oscillator for producing pulses synchronously with the frequency of said oscillator, said unmodulated signal providing the clock signals to said modulator so that the distances between pulses representing said additional information to be transmitted is derived by counting the periods of the unmodulated signal.

3. A system as claimed in claim 1 wherein section receiving means coupled to proximate terminals of said sections viewed in the direction of travel of said railroad vehicle, comprises means for actuating a signal and means for controlling the transmitter of the adjacent rail section proximate to said receiving means thereby transmitting said signals with pulses superimposed thereon to adjacent sections.

4. A system for the transmission of information throughout a railroad system having a plurality of adjacent rail sections for the transmission of unmodulated signals, said signals having frequencies representing signalling information, each section being electrically isolated for operation at a different frequency, said information systems comprising transmitting means coupled to said sections for producing pulses synchronously with the frequency of said signals, said pulses being superimposed upon said signals and having pulse repetition periods representing additional information, said transmitting means further comprising means for controlling said modulator from remote sections viewed in the direction of travel of said vehicle by varying the frequency of said pulses, and receiving means within railroad vehicles for picking up and decoding said additional information.

5. A system for the transmission of information throughout a railroad system having a plurality of adjacent rail sections for the transmission of unmodulated signals, said signals having frequencies representing signalling information, each section being electrically isolated for operation at a different frequency, said information systems comprising transmitting means coupled to said section for producing pulses synchronously with the frequency of said signals, said pulses being superimposed upon said signals and having pulse repetition periods representing additional information and receiving means within railroad vehicles for picking up and decoding said additional information, said receiving means comprising pick-up means for detecting said unmodulated signals with pulses superimposed thereon and separating said pulses from said unmodulated signals, and decoding means comprising a shift register and logic circuits coupled to said shift register for identifying said additional information derived by converting delayed pulse positions within said shift register into voltages proportional to said positions.

6. A system as claimed in claim 5 further comprising display means for reading out said additional information.

* * * * *